United States Patent [19]
Eckert

[11] 3,741,582
[45] June 26, 1973

[54] SUSPENSION SYSTEM FOR A CAR
[75] Inventor: Konrad Eckert, Stuttgart-Bad Cannstatt, Germany
[73] Assignee: Robert Bosch GmbH, Stuttgart, Germany
[22] Filed: Apr. 26, 1971
[21] Appl. No.: 137,352

[30] Foreign Application Priority Data
Apr. 25, 1970  Germany.................... P 20 20 292.0

[52] U.S. Cl............................ 280/124 F, 267/65 D
[51] Int. Cl........................................... B60g 17/04
[58] Field of Search ................ 280/124 F; 267/65 D

[56] References Cited
UNITED STATES PATENTS
3,547,466  12/1970  Millican.......................... 280/124 F
3,191,954  6/1965  Schuetz...................... 280/124 F X
2,993,705  7/1961  D'Avigdor.................. 280/124 F X Primary Examiner—Philip Goodman
Attorney—Michael S. Striker

[57] ABSTRACT

A suspension system for supporting the body of a motor car includes cylinder and piston means connecting the body with the wheel shafts and forming first and second chambers connected with first and second sources of pressure fluid. A regulating valve varies and adjusts the flow cross section of the first and second conduits and thereby the flow of the pressure fluid into the first and second chambers until no resonance oscillations of the body take place.

11 Claims, 8 Drawing Figures

SUSPENSION SYSTEM FOR A CAR

BACKGROUND OF THE INVENTION

It is known to connect two masses of a motor car by double-acting cylinder and piston means in which the chambers on opposite sides of the piston are connected by two pressure conduits to two sources of pressure. A suspension system of this type is described in the FR 828,820. The apparatus has the disadvantage that only an undampened resilient suspension of the movements of the two masses is obtained, so that resonance oscillation can occur.

SUMMARY OF THE INVENTION

It is one object of the invention to overcome the disadvantages of known suspension systems, and to provide a suspension system whose oscillations are out of tune.

A related object of the invention is to provide a suspension system which has no inherent characteristic frequency, and operates without resonance.

With these objects in view, the present invention provides in at least one of the conduits which connect sources of pressure fluid with the cylinder chambers of the suspension, a regulating apparatus which is operable and adjustable to obtain a different coupling between the two masses connected by the cylinder and piston means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
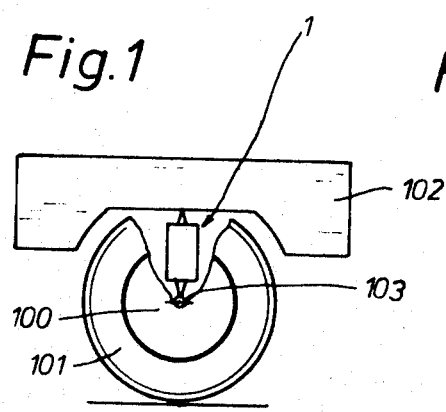
FIG. 1 is a fragmentary elevation illustrating a part of a motor car provided with the suspension system of the invention.
Figure 1A:
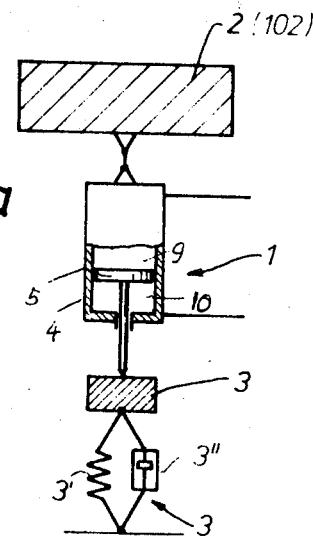
FIG. 1a is a vertical sectional view schematically illustrating the suspension system between two masses of the motor car.

Referring first to FIGS. 1 and 1a, a suspension system 1 is provided on a motor car for which only the wheel 100, the tire 101, a shaft 103, and a body 102 are shown in FIG. 1. the same arrangement is shown in FIG. 1a schematically, and it will be seen that the suspension system is arranged between a mass 2, which is the mass of the body 102, and a mass 3, which is the unsprung part of the car. The unspring mass 3 includes the mass of the shaft 103 and the springs 3', and also the damping 3'' of the tire 101

Figure 1B:
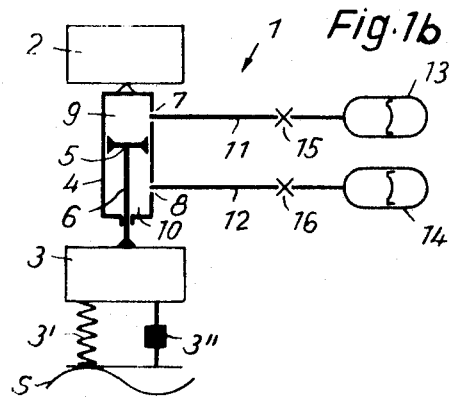
FIG. 1b is a schematic view illustrating a first embodiment of the invention in which no additional energy is supplied from the outside to the suspension system.

As shown in FIG. 1b, the suspension includes a double-acting cylinder 4 in which a piston is movable in sealing engagement, forming in the cylinder first and second chambers. Piston 5 has a piston rod 6 connected with the schematically shown mass 3, while cylinder 4 is pivotally connected with mass 2, as also shown in FIG. 1b. The arranged may be reversed.

Figure 4:
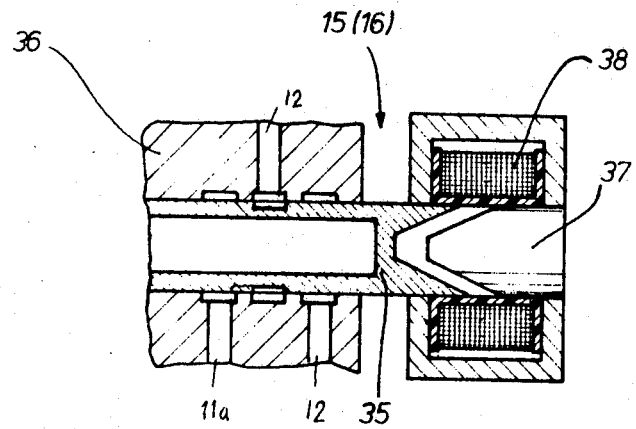
FIG. 4 is a fragmentary sectional view illustrating a regulating valve according to the invention on an enlarged scale.
Figure 5:
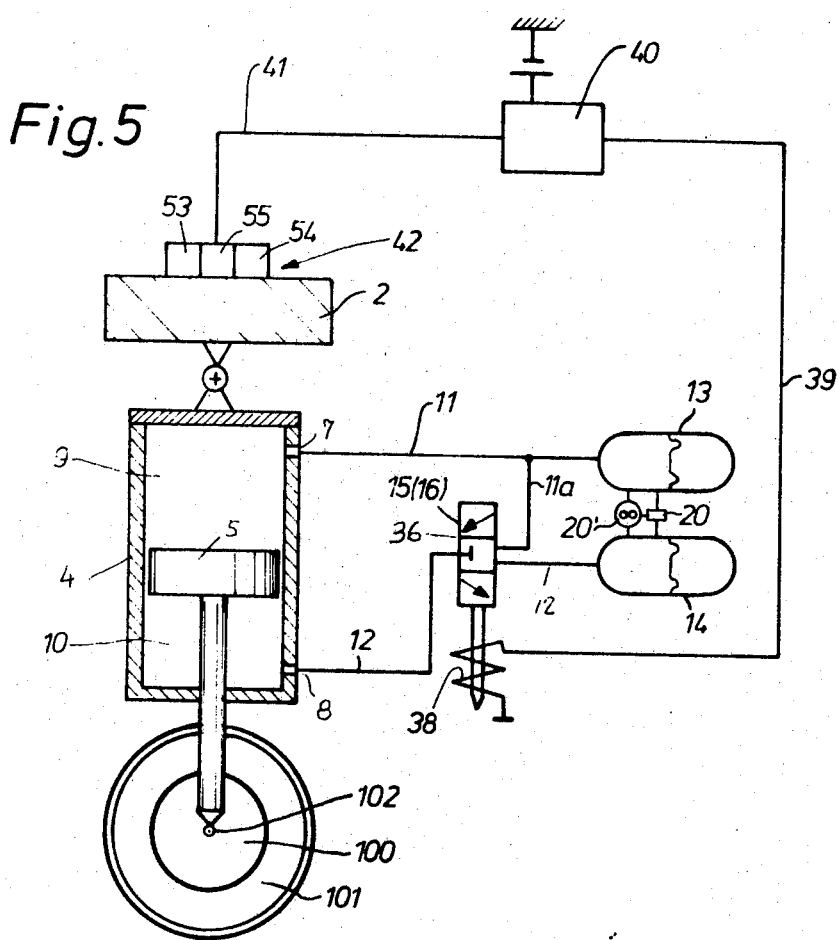
FIG. 5 is a partly schematic view illustrating the suspension, and partly a diagram illustrating the electric circuit controlling the operation of a regulating valve.

The lower first cylinder chamber 10 has a connector 8 to which a first conduit 12 is connected which receives pressure fluid from a source of pressure fluid 14. The upper section cylinder chamber 9 is connected by connector 7 with a second conduit 11 which receives pressure fluid from a second source of pressure fluid 13. Valve means 15 and 16 are respectively located in conduits 11 and 12, and are part of the regulating valve means 36 as shown in FIG. 4 in an intermediate position. A valve slide 35 is connected with the armature 37 of an electromagnet 38, so that it can be shifted between three positions. Armature 37 is frustoconical so that the force applied by armature 37 to slide 35 remains substantially constant during the entire stroke of the armature 37. As best seen in FIG. 5, where a further development is shown, regulating valve 36 is located in conduit 12, and connected by a conduit 11a with conduit 11.$^{+)}$(+) For maintaining a differential pressure in the two sources of fluid 13 and 14 (source 13 has the higher and source 14 the lower pressure) they are connected by a pump 20' and a differential pressure valve 20, which regulates pump 20'.) In the intermediate position illustrated in FIG. 5, the source of fluid 13 is connected with chamber 9, and the source of fluid 14 is disconnected from conduit 12. Consequently, the body mass 2 will be raised. In a first displacement position of valve slide 35, source 14 is disconnected, and source 13 is connected to both chambers 9 and 10 of cylinder 4. In a third position of slide 35, chamber 10 is connected with source 14 through valve 36, and source 13 is directly connected with chamber 11. Due to the construction of the regulating valve 36 shown in FIG. 4, a throttling effect is obtained during movement of the valve slide 35 between the three positions.

FIG. 5 also shows the circuit of electromagnet 38, A control apparatus 40 transmits the signals to electromagnet 38 by which the valve slide 35 is operated. Control apparatus 40 receives control signals through a conductor system 41 from sensing means 42 which measure distance of displacement, speed of displacement, and acceleration of the body mass 2. Control apparatus 40 transmits the signals to electromagnet 38 through conductor 39 depending on the signal received from the sensing means 42.

Since the flow cross sections in the valve 36 are adjusted by the slide 35, the coupling between the masses 2 and 3 is varied, which requires a synchronous operation of the schematically shown regulating valves 15 and 16 of FIG. 1b obtained by movement of valve slide 36. The control of the flow cross section takes place at a high frequency between 1 and 1,000 Hertz.

When the flow cross sections of one of the pressure conduits 11 or 12 is fully opened, the suspension system operates, disregarding pressure losses in the system, as an undampened spring, while when one of the pressure conduits 11 or 12 is closed, the suspension operates as a rigid linkage.

Consequently, the swinging of two masses is replaced by the coupling of two masses by a regulating valve which is part of an electrically controlled regulating apparatus. If the control circuit is suitably designed, resonance oscillation in critical ranges of frequency can be avoided. The function of the control circuit is influenced by signals representing the behavior of the car. The signals may represent oscillations of the body mass relative to the surrounding, such as distance, speed, and acceleration of the displacement, or represent shaft oscillation relative to the surroundings, and the distance, speed and acceleration of the same, or oscillations between the body mass 2 and the shaft mass 3, particularly the distance, speed and acceleration of the osciallations.

Resonance oscillations are prevented by selecting suitable regulating parameters or tuning the oscillation off resonance. The regulating parameters are, for example, the proportionality factor, time loss, and time of lag.

Figure 6:
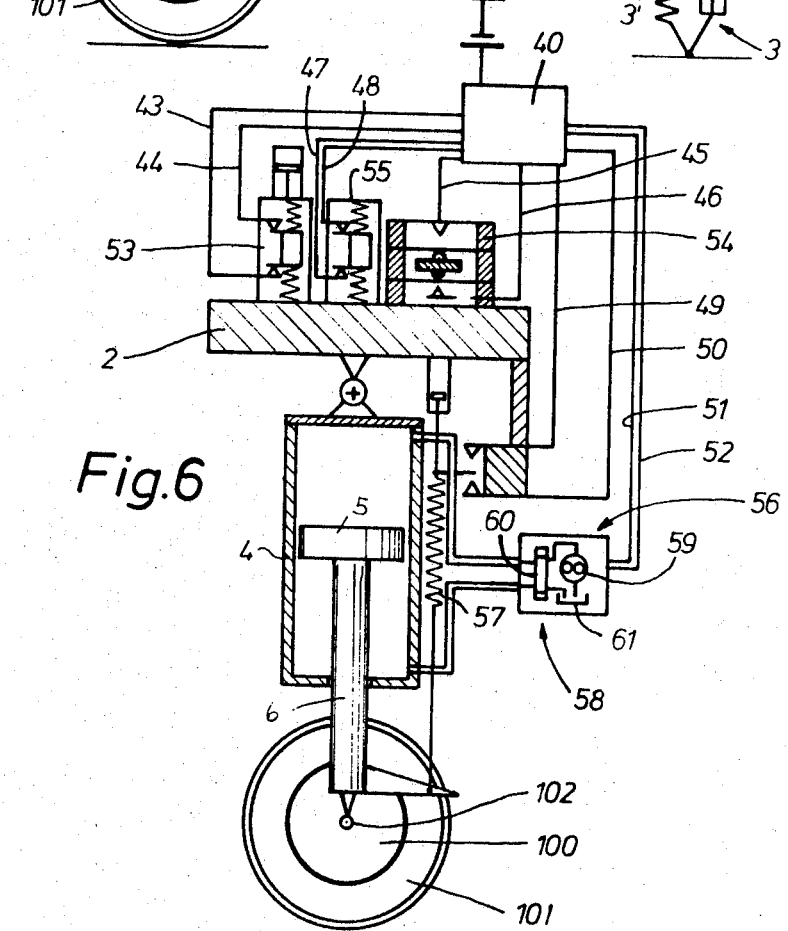
FIG. 6 is partly a schematic sectional view illustrating the suspension, and partly a diagram illustrating details of the electric control circuit.

FIG. 6 shows the control circuit in greater detail. The system of connector 41, shown in FIG. 5 as a single line, corresponds to three pairs of conductors 43–44, 45–46, and 47–48. The pair of conductors 43–44 is connected with a dampened seismic system 53 having an extremely low frequency, which is secured to the body mass 2 of the car, and continuously measures the displacement distance of the body mass 2 relative to the surrounding.

The pair of conductors 45–46 is connected with a membrane spring system 54 which measures the acceleration of the displacement of body mass 2 relative to the surrounding, and is tuned to a high frequency.

The pair of conductors 47–48 is connected with a medium frequency seismic system 55, also secured to the body mass 2.

Another pair of conductors 49–50 connects the control apparatus 40 with two contacts which cooperate with a third contact mounted on a resilient linkage 57 which connects piston rod 6 with the body mass 2, so that the level of the body mass 2 is determined, and corresponding signals supplied to the control apparatus 40.

A pair of conductors 51–52 is controlled by signals from the control apparatus 40 to energize the motor of a pump 59 which pumps fluid through a valve 60 into the chambers of the cylinder 4, so that the level of the body mass is automatically adjusted by the device 56 which includes the hydraulic unit 58 and the linkage 57. The device 56 maintains the body mass 2 at a medium height. Starting from this normal position of the body mass 2, the suspension is controlled by signals representing movements of the body mass 2 relative to the surroundings.

Figure 2:
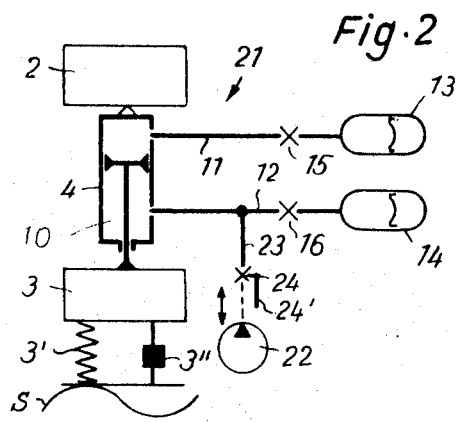
FIG. 2 is a schematic view illustrating a second embodiment of the invention in which an additional source of outside energy is provided.

FIG. 2 has a modified suspension 21 which differs from suspension of FIG. 1 by having an additional source of energy. Corresponding parts are indicated in FIGS. 1 and 2 by the same reference numerals. The additional source of energy is a pump 22 which is connected by a conduit 23 with conduit 12. A valve 24 is located in conduit 23 and has a position connecting pump 22 with conduit 12 and a chamber 10, and another position in which fluid is discharged through a discharge conduit 24'. The valve 24, together with the regulating valve 16, can be operated to increase the pressure in the container 14, or release the pressure, and this regulation is superimposed on the regulation under the control of the control circuit described withe reference to FIGS. 5 and 6.

Pump 22 may be replaced by a container for a pressure fluid, similar to the containers for pressure fluid 13 and 14.

The suspension system of FIG. 2 receives energy from the outside in the form of pressure fluid pumped by pump 22. This permits an adjustment of the medium distance between the masses 2 and 3, and furthermore influencing of the oscillation attitudes of the two masses 2 and 3, in addition to the regulation by the regulating valve means 15,16, or 36.

Figure 3:
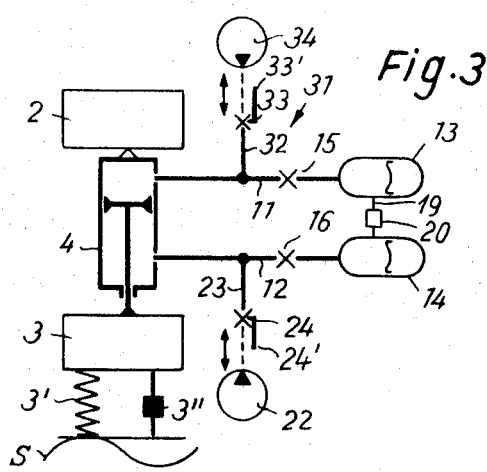
FIG. 3 is a schematic view illustrating a third embodiment of the invention in which two additional sources of outside energy are provided.

If required by the conditions, an additional source of energy can also be connected to the pressure conduit 11, as shown in FIG. 3 for the modified suspension system 31, in which each of the pressure conduits 11 and 12 is connected by pressure conduits 23 and 32 and regulating valves 24 and 33 with additional sources of energy 22 and 34. Regulating valves 24 and 23 are connected with discharge conduits 24' and 33'. The additional sources of energy 22 and 34 are preferably constructed as pumps which permits it to influence the oscillation amplitudes of the two masses 2 and 3.

In the embodiment of FIG. 3, the pressure containers 13 and 14 are connected by a conduit 19 in which a valve 20 responsive to differential pressures, equalizes pressure differences between the pressure containers 13 and 14.

The suspension system 31 can operate in four conditions.

1. When regulating valves 15 and 16 hold the flow cross sections open, and the valves 24 and 33 hold the flow cross section closed, the two masses 2 and 3 can freely oscillate relative to each other.

2. When regulating valves 15 and 16 and the valve 24 and 33 hold the flow cross sections closed, the two masses 2 and 3 are rigidly connected with each other.

3. When regulating valves 24 and 15 hold the flow cross sections open, and the regulating valves 33 and 16 hold the flow cross sections closed, pressure fluid from pump 22 operates piston 5 to the move masses 2 and 3 toward each other.

4. When regulating valves 33 and 16 open the flow cross sections, and the regulating valves 24 and 15 close the flow cross sections, then the pump 34 provides pressure fluid for moving the masses 2 and 3 away from each other.

It will be understood that each of the elements described above, or two or more together, may also find a useful application in other types of suspensions for motor cars differing from the types described above.

While the invention has been illustrated and described as embodied in a suspension system for a car, including regulating apparatus for varying the flow cross sections of conduits connecting pressure sources with cylinder and piston means between the masses of a car, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, farily constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Suspension system for a car having relatively movable first and second masses, comprising cylinder and piston means connecting said first and second masses and including a cylinder connected with one of said masses and a piston connected with the other one of said masses and dividing said cylinder into first and second chambers; first and second sources of pressure fluid; first and second conduit means connecting said first and second sources with said first and second chambers, respectively; regulating apparatus in at least one of said first and second conduits for varying the flow cross section in the same so as to adjust the yielding resistance of said cylinder and said piston against relative movement of said first and second masses until resonance oscillations of the same are prevented, said regulating apparatus including means for varying the flow cross section at least in said one conduit means at the high frequency between a closed condition and a fully open condition so that the suspension system operates as an undampened spring when said one conduit means is open, and as a rigid coupling when said one conduit means is closed whereby oscillations are suppressed.

2. Suspension system as claimed in claim 1 comprising a connecting conduit connecting the other conduit means of said first and second conduit means with said one conduit means; and wherein said regulating apparatus includes regulating valve means having a first variable throttle located in said connecting conduit; and a second variable throttle in said one conduit means.

3. Suspension system as claimed in claim 2 wherein said regulating valve means include a valve slide for simultaneously varying said first and second variable throttles.

4. Suspension system as claimed in claim 1 wherein said regulating apparatus includes regulating valve means, and electric operating means for varying said flow cross section.

5. Suspension system for a car having relatively movable first and second masses, comprising cylinder and piston means connecting said first and second masses and including a cylinder connected with one of said masses and dividing said cylinder into first and second chambers; first and second sources of pressure fluid; first and second conduit means connecting said first and second sources with said first and second chambers, respectively; regulating apparatus in at least one of said first and second conduits for varying the flow cross section in the same so as to adjust the yielding pressure of said cylinder and said piston against relative movement of said first and second masses until resonance oscillations of the same are prevented; at least one additional conduit connecting said additional source with said first conduit means; and a valve in said additional conduit having a first position for supplying pressure fluid to said first conduit means, and a second position for discharging pressure fluid from said first conduit and chamber.

6. Suspension system for a car having relatively movable first and second masses, comprising cylinder and piston means connecting said first and second masses and including a cylinder connected with one of said masses and a piston connected with the other one of said masses and dividing said cylinder into first and second chambers; first and second sources of pressure fluid; first and second conduit means connecting said first and second sources with said first and second chambers, respectively; regulating apparatus in at least one of said first and second conduits for varying the flow cross section in the same so as to adjust the yielding resistance of said cylinder and said piston against relative movement of said first and second masses until resonance oscillations of the same are prevented, said regulating apparatus including regulating valve means, and electric operating means for varying said flow cross section at least in said one conduit means at the high frequency between a closed position and a fully open conduit so that the suspension system operates as an undampened spring when said one conduit is opened, and as a rigid coupling when said one conduit means is closed; at least additional source of pressure fluid; at least one additional conduit connecting said additional source with said said first conduit means; and a valve in said additional conduit having a first position for supplying pressure fluid to said conduit means, and a second position for discharging pressure fluid from said first conduit and chamber.

7. Suspension system as claimed in claim 6 including electric operating means for controlling said valve to open and close at a high frequency for varying the distance between said first and second masses; and wherein said frequency is between 1 and 1,000 Hertz.

8. Suspension system for a car having relatively movable first and second masses, comprising cylinder and piston means connecting said first and second masses and including a cylinder connected with one of said masses and a piston connected with the other one of said masses and dividing said cylinder into first and second chambers; first and second sources of pressure fluid; first and second conduit means connecting said first and second sources with said first and second chambers, respectively; regulating apparatus in at least one of said first and second conduits for varying the flow cross section in the same so as to adjust the yielding resistance of said cylinder and said piston against relative movement of said first and second masses until resonance oscillations of the same are prevented, said regulating apparatus including regulating valve means, and electric operating means for varying said flow cross section at least in said one conduit means at a high frequency between a closed condition and a fully open condition so that the suspension system operates as an undampened spring when said one conduit means is opened, and as a rigid coupling when said one conduit means is closed, said electric operating means including control means actuated by movement of at least one of said first and second masses to generate control signals; and electromagnetic means receiving said signal and responsing to the same to move said regulating valve means at said high frequency.

9. Suspension system for a car having relatively movable first and second masses, comprising cylinder and piston means connecting said first and second masses and including a cylinder connected with one of said masses and a piston connected with the other one of said masses and dividing said cylinder into first and second chambers; first and second sources of pressure fluid; first and second conduit means connecting said first and second sources with said first and second chambers, respectively; regulating apparatus in at least one of said first and second conduits for varying the flow cross section in the same so as to adjust the yielding resistance of said cylinder and said piston against relative movement of said first and second masses until resonance oscillations of the same are prevented, said regulating apparatus including regulating valve means including first and second throttle passages, a valve slide for simultaneously varying the flow cross sections of said first and second throttle passages, electromagnetic means for moving said valve slide, and control means for energizing said electromagnetic means at a frequency between 1 and 1000 Hertz and being responsive to movement of at least one of said first and second masses relative to a fixed point of the surrounding thereof.

10. Suspension system as claimed in claim 9 comprising an auxiliary pump; an additional conduit connecting said pump with said first conduit means downstream of said regulating valve means, and a valve in said additional conduit and having a first position for supplying pressure fluid to said first conduit means and through the same to said first chamber, and a second position for discharging fluid from said first chamber.

11. Suspension system as claimed in claim 10 comprising another auxiliary pump, an other additional conduit connecting said pump with said second conduit means, and an other valve in said other additional conduit having a first position for supplying pressure fluid to said second conduit means and to said second chamber, and a second position for discharging fluid from said second conduit and second chamber.

* * * * *